United States Patent [19]
Herr

[11] 3,736,814
[45] June 5, 1973

[54] TRANSMISSION INPUT CLUTCH
[75] Inventor: Charles H. Herr, Peoria, Ill.
[73] Assignee: Caterpillar Tractor Co., Peoria, Ill.
[22] Filed: Jan. 14, 1972
[21] Appl. No.: 217,784

[52] U.S. Cl. ........................74/740, 74/339, 74/781, 192/105 A
[51] Int. Cl. .........F16h 5/36, F16h 3/38, F16h 57/10
[58] Field of Search........................74/740, 339, 781; 192/105 A

[56] References Cited
UNITED STATES PATENTS

| | | |
|---|---|---|
| 2,793,533 | 5/1957 | Swenson et al.....................74/740 X |
| 3,094,012 | 6/1963 | Ferguson..............................74/740 |
| 3,354,729 | 11/1967 | Marquart............................74/740 X |
| 3,396,610 | 8/1968 | Rich, Jr. et al. .......................74/740 |

Primary Examiner—Arthur T. McKeon
Attorney—Donald J. McRae and Fryer, Tjensvold, Feix, Phillips & Lempio

[57] ABSTRACT

Clutch mechanism for coupling an engine to a transmission of the form in which ratio gears are decoupled from both the driving and driven shafts and braked to a stop to facilitate shifting has epicyclic gear means for imparting a predetermined slow rotation to the ratio gears just prior to full recoupling of the ratio gears to the driving engine and driven load. This assures that all necessary gear engagements are accomplished smoothly and without damage prior to the reapplication of full torque load to the transmission.

10 Claims, 6 Drawing Figures

Fig_5

TRANSMISSION INPUT CLUTCH

BACKGROUND OF THE INVENTION

This invention relates to input clutches for disposition between a driving engine and a multispeed transmission and more particularly to torque input clutches for transmissions of the form in which change speed gears are momentarily braked to a stop to facilitate shifting.

A common type of transmission for coupling an engine to driven means such as the wheels of a vehicle has a plurality of change speed or ratio gears which may be shifted to provide a selected one of several drive ratios. In the more conventional form such transmissions are used with an input clutch for disconnecting the engine from the change speed gearing during the course of a shift. In this more conventional form of such transmissions, the output member of change speed gearing remains connected to the rotating driven load and thus it is necessary to provide synchronizers within the gearing system to facilitate shifting. The synchronizers have the undesirable effect of adding to bulk, complexity and maintenance problems in the transmission. As a practical matter, the need for synchronizers has the further effect of limiting the number of drive ratios obtainable with a given set of ratio gears to a number smaller than the theoretical number of different power paths there through.

U.S. Pat. No. 3,508,450 discloses a form of transmission in which synchronizers are not needed and thus the problems discussed above are alleviated. In the transmission of U. S. Pat. No. 3,508,450, a clutch is provided at both the input and output ends of the change speed gearing, together with means for braking the gears, so that the desired shifting can be accomplished with the gears in a stationary or near stationary condition. At the conclusion of the shift transient, the shifted gears are then reaccelerated and recoupled to both the driving engine and driven load.

In a transmission of the last discussed type there is a possibility that the braked change speed gears may come to rest in a position at which tooth abuttment occurs when shifting is attempted. This condition is corrected, so that gear engagement may proceed, when the gearing begins to reaccelerate at the end of the shift transient. However, the extremely rapid and forceful reacceleration which occurs when the input clutch reengages may be too fast for this purpose. Accordingly, U.S. Pat. No. 3,508,450 discloses a form of "roll-over" means which imparts a slow rotation to the change speed gearing, to assure gear engagement, prior to the time that the input clutch reengages to apply full engine torque to the gearing. In particular, prior U.S. Pat. No. 3,508,450 teaches a friction disc means operative between a portion of the input clutch which remains rotating when the clutch is disengaged and the input to the change speed gearing. The brake which holds the change speed gearing stationary during the shift transient is released slightly before the input clutch reengages and thus a limited amount of torque is transmitted to the change speed gearing by the friction disc for a brief interval to provide the desired slowly-accelerating, roll-over motion.

The friction disc roll-over means described above is highly sensitive to variations in the viscosity of the lubricating medium in the input clutch and to slight dimensional changes resulting from wear or temperature variations. As a consequence, the timing of roll-over motion and the amount of torque transmitted to the change speed gears for roll-over purposes varies undesirably. Further, the speed of the roll-over motion cannot be precisely predetermined nor kept constant under varied operating conditions. Wear of the ratio gears is thereby decreased and tooth breakage may occur.

SUMMARY OF THE INVENTION

The present invention provides an input clutch for a transmission of the form described above having a roll-over mechanism in which both the timing and the speed of the roll-over motion in the change speed gearing is more reliably controlled.

A pair of sun gears are used for this purpose, a first of which is coupled to the change speed gears for rotation therewith with the second being supported for rotation relative thereto. Epicyclic gear means, which rotates in both the engaged and disengaged condition of the input clutch is coupled to both sun gears with a slightly different drive ratio with respect to each sun gear. Thus if one of the sun gears is forcibly stopped the other is constrained to rotate slowly. The input clutch includes brake means which stops the change speed gears during the initial portion of the shift transient and thereby also stops the first sun gear causing the second sun gear to rotate. The brake means releases the first sun gear towards the end of the shift period and stops the second sun gear causing the first sun gear to rotate and turn the change speed gearing with the desired slow roll-over motion.

Accordingly, it is an object of this invention to facilitate the shifting of transmissions of the form having change speed gears which are brought to a stationary or near stationary condition for shifting purposes.

It is a further object of the invention to provide an input clutch for coupling an engine to a multispeed transmission of the form having change speed gears which are brought to a stationary or a near stationary condition for shifting, wherein a relatively slow rotational motion is imparted to the change speed gears at the conclusion of shift period with precise timing and at a predetermined speed.

It is still another object of this invention to reduce wear and the risk of gear tooth damage in transmissions of the form described above.

The invention, together with further objects and advantages thereof, will best be understood by reference to the following description of preferred embodiments taken in conjunction with the accompanying drawings.

DESCRIPTION OF PREFERRED EMBODIMENTS

Figure 1:
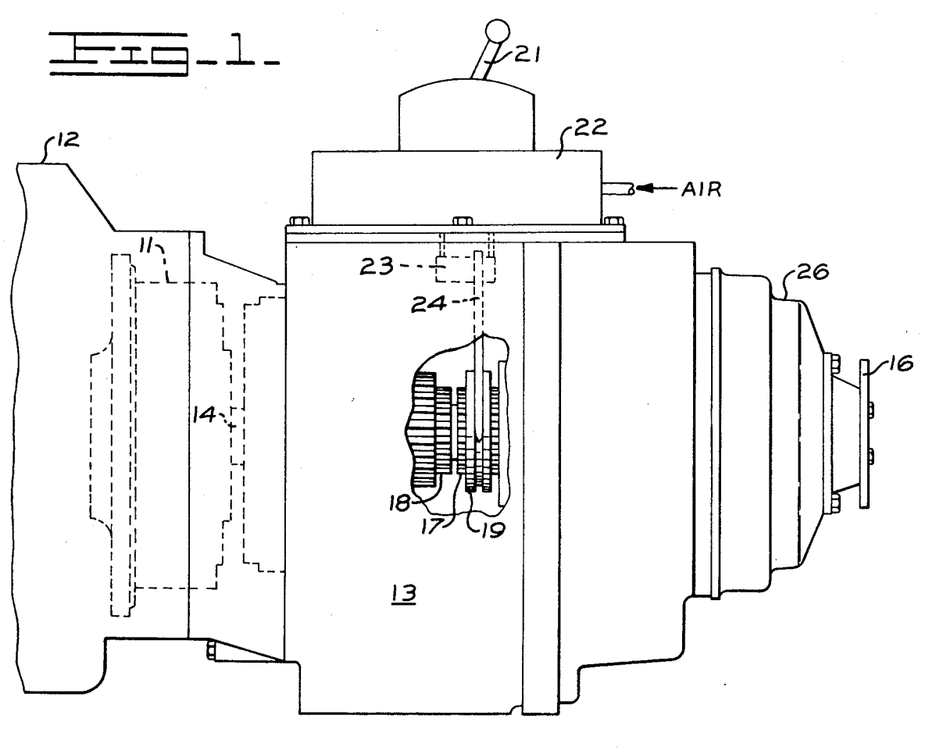
FIG. 1 is a partially broken out side elevation view of a vehicle transmission having an input clutch in accordance with the invention.

Referring initially to FIG. 1 of the drawing, an input clutch assembly 11 in accordance with the invention is coupled between an engine 12 which may be of conventional form and a transmission 13 of the form described in U.S. Pat. No. 3,508,450. In order to facilitate understanding of the functions of the clutch assembly 11, certain significant characteristics of the transmission 13 will be briefly described, reference being made to U.S. Pat. No. 3,508,450 for suitable detailed description of such a transmission. Such a transmission 13 has an input shaft 14 which receives torque from the driving engine 12 through the input clutch assembly 11 and has an output flange 16 to which torque is delivered for driving a rotary load such as the wheels of a vehicle. A transmission 13 of this form contains a plurality of change speed gears of which two such gears 17 and 18 are shown in FIG. 1. Any selected one of a plurality of drive ratios between input shaft 14 and output flange 16 may be established by shifting the pattern of engagements between the several change speed gears. In this example gears, such as gears 17 and 18, may be selectively engaged or disengaged by axial movement of an internally toothed annular clutch collar 19 splined to one of the two gears, such as gear 17 in this instance. Axial movement of clutch collar 19 towards gear 18 causes the collar to engage both gears 17 and 18 and thereby establish a driving connection therebetween. As described in U.S. Pat. No. 3,508,450, the transmission 13 contains additional gear pairs and clutch collars 19 in order to establish any selected one of a plurality of drive ratios.

To shift the appropriate ones of the clutch collars 19 in response to movement of an operator's control lever 21 between the various speed settings thereof, a pneumatic control circuit 22 actuates predetermined ones of a series of fluid pressure operated cylinder 23 to manipulate shift forks 24 which engage the clutch collars 19. Control circuit 22 may be of the form described in detail in U.S. Pat. No. 3,570,636 and reference should be made thereto for a description of the detailed structure and operation of a suitable pneumatic control circuit.

It may be observed in FIG. 1 that in contrast to more conventional transmissions of this general class, no synchronizers are provided to facilitate engagement of the internal teeth of clutch collar 19 with the external teeth of change speed gear 18. Instead, input clutch assembly 11 responds to a pneumatic signal indicative of movement of the operator shift lever 21 from one speed setting to another by first decoupling transmission shaft 14 from engine 12 and then braking the input shaft to stop rotation of the change speed gears which are coupled thereto. The transmission 13 has an output clutch assembly 26 which also responds to such signal by decoupling the output flange 16 from the change speed gears. Accordingly, with the change speed gears such as gears 17 and 18 momentarily stopped, the need for conventional synchronizers is eliminated. After pneumatic cylinders 23 have been actuated by control circuit 22 to shift the appropriate clutch collars 19, input clutch assembly 11 effects a modulated recoupling of engine 12 to transmission input shaft 14 and output clutch 26 reengages to reestablish drive through the transmission 13 at the newly selected drive ratio.

By thus stopping the change speed gears during the course of a shift the need for conventional synchronizers is avoided. However with the gears, such as gears 17 and 18, stopped in this manner it may not be possible to immediately shift clutch collar 19 to engage ears 17 and 18 if the rotational position of the clutch collar relative to gear 18 is such that tooth abutment occurs. Under this circumstance, the desired engagement is not effected until gear 18 again begins to rotate and thereby brings the two sets of teeth into a suitable relationship for engagement. It is not desirable to rely upon the recoupling of transmission input shaft 14 to engine 12 through input clutch assembly 11 at the end of the shift cycle for this purpose. The resultant acceleration of gear 18 at that time is extremely rapid. As a consequence, the engagement of clutch collar 19 with gear 18 could be either too abrupt or might not occur at all causing severe shocks, excessive tooth wear and the risk of tooth breakage.

Accordingly in this form of transmission it is preferable to provide for a relatively slow rotation of the transmission input shaft 14 just prior to the time that input clutch 11 reengages and applies the full torque of engine 12 thereto. Heretofore, as described in U.S. Pat No. 3,508,450 for example, this has been accomplished through friction disc means which transmits a limited amount of torque from engine 12 to input shaft 14 while the clutch 11 is still in the disengaged condition. Such friction drives do not provide for a precise predetermined rotation of input shaft 14 but are subject to considerable variation in the speed and timing of input shaft rotation due to such causes as temperature changes, variations in viscosity of the lubricating medium, and wear.

The input clutch 11 of the present invention alleviates these problems by providing for precisely timed roll-over of the transmission input shaft 14 at a predetermined speed, relative to engine 12, just prior to transmission of full engine torque through the input clutch.

Figure 2:
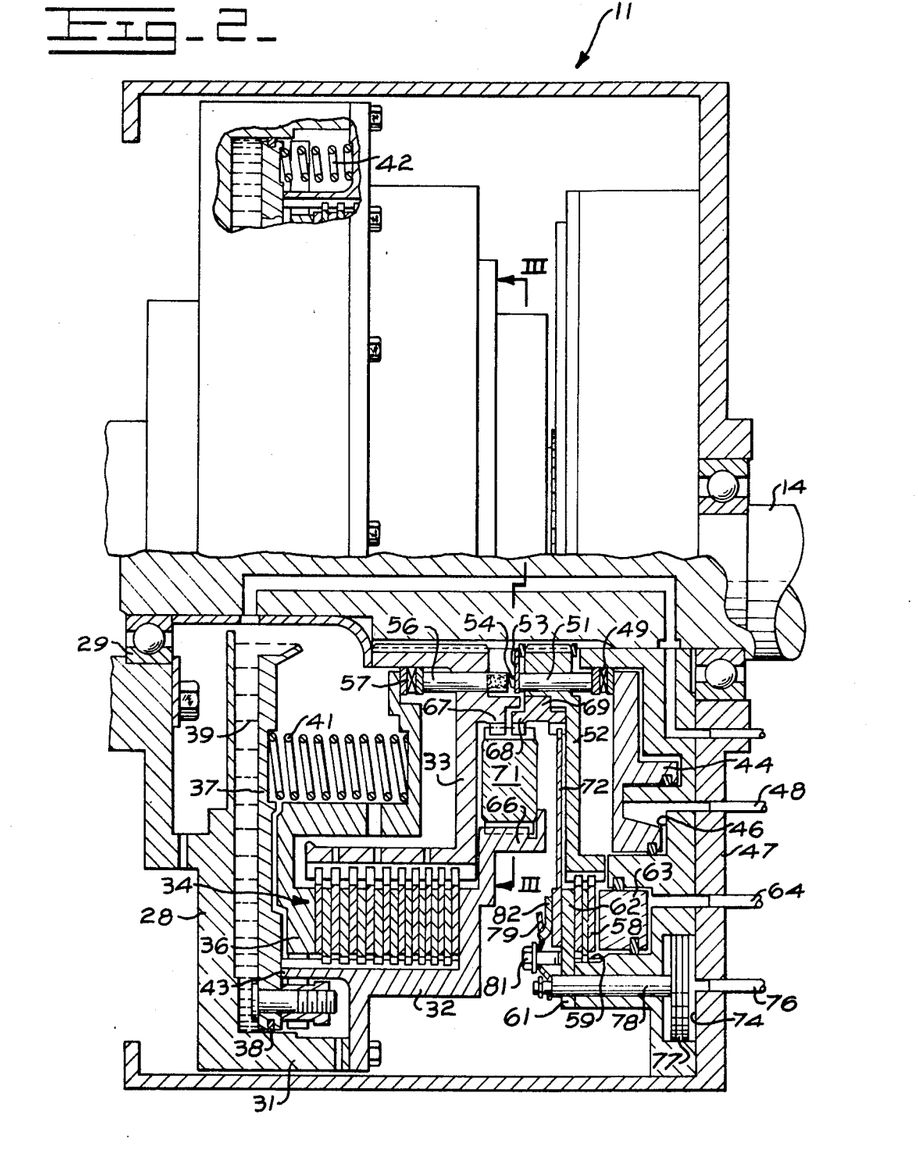
FIG. 2 is a side view, partially broken out and partially in axial section, of the input clutch depicted in FIG. 1.

Referring now to FIG. 2, certain components of input clutch assembly 11 are essentially similar to those of the input clutch mechanism described in co-pending application Ser. No. 30,680 now U.S. Pat. No. 3,667,583 for Elmer A. Richards for SELF-MODULATED INPUT CLUTCH FOR VEHICLE DRIVE TRANSMISSIONS, filed Apr. 22, 1970 and assigned to the Assignee of the present application. Basically, an input clutch assembly of this form may have a main shaft which is the output member and which may simply be a forward extension of the input shaft 14 of transmission 13 where the clutch assembly is formed integrally with the transmission as an essentially unitary mechanism therewith as described in co-pending application Ser. No. 30,680. The drive input member of the clutch assembly may be the engine flywheel 28 which is coaxial with respect to the forward end of main shaft 14 with a bearing 29 being disposed therebetween. Flywheel 28 has a rearwardly extending annular sleeve portion 31 to which an annular input member 32 is secured for rotation with the flywheel. An annular driven hub 33 is splined to main shaft 14 radially inward from input member 32.

When the clutch assembly 11 is engaged input member 32 transmits drive from flywheel 28 to driven hub 33 through a pack 34 of annular clutch plates of which alternate ones are splined to the input member 32 and the intervening ones are splined to driven hub 33. To apply pressure to clutch pack 34 when the clutch assembly 11 is to be engaged, an annular pressure plate 36 is disposed co-axially with respect to shaft 14 forwardly from driven hub 33. Pressure plate 36 is movable in an axial direction and may be caused to bear against the forward end of clutch pack 34 to compress the clutch pack against input member 32 thereby causing torque to be transmitted from flywheel 28 to shaft 14.

Considering now the means through which the clutch assembly 11 automatically performs the engagement, disengagement and modulation functions which customarily require operator control by means of a clutch pedal or the like, an annular axially movable capacity modifying plate 37 is situated between flywheel 28 and pressure plate 34 within the sleeve portion 31 of the flywheel. An annular seal 38 is mounted in the rim of modifying plate 37 to provide a fluid tight seal with the adjacent inner surface of flywheel sleeve 31 whereby when the flywheel is rotated by the associated engine, a volume of lubricating fluid such as oil 39 is trapped between the flywheel and modifying plate by centrifugal force which tends to cause the fluid to move radially outward with respect to the rotary axis of the system. The rotating volume of oil 39 trapped in this manner by centrifugal force exerts an axial force against modifying plate 37 tending to urge plate 37 in the direction of pressure plate 36 with the magnitude of such force being a function of the rotational speed of flywheel 28. This variable force causes disengagement of the clutch at idling speeds and a modulated reengagement as speed is increased through an intermediate range.

For this purpose a series of engagement springs 41 act between modifying plate 37 and pressure plate 36 and a series of disengagement springs 42 act between the modifying plate and input member 32. Disengagement springs 42 thus tend to resist the force of fluid 39 against modifying plate 37 and at low engine speeds are able to hold the modifying plate in the forward position adjacent to flywheel 28. At this position of the modifying plate 37, engagement springs 41 do not transmit any significant force from the modifying plate to pressure plate 36. Accordingly under this condition the clutch pack 34 is not compressed and torque is not transmitted from flywheel 28 to shaft 14. As engine speed is increased, the force of fluid 39 begins to overcome springs 42 and the modifying plate 37 shifts rearwardly. Such motion of the modifying plate 37 causes engagement springs 41 to exert an increasing force against pressure plate 36 and thus an increasing force is exerted against clutch pack to produce the modulated engagement wherein the clutch capacity is a function of engine speed thereby duplicating the conventional actions of a human operator in controlling the clutch pedal of a vehicle.

While the modulated reengagement described above is desirable at intermediate engine speeds, the clutch capacity should be held substantially constant at higher engine speeds. Accordingly, an annular stop 43 extends forward from input member 32 to block further backward motion of modifying plate 37 after the engine speed reaches the predetermined value at which the clutch capacity versus engine speed curve should flatten out. Once modifying plate 37 abuts stop 43, the pressure of fluid 39 no longer causes a variation of the clutch capacity which is then determined solely by the engagement springs 41.

In order to accomplish a shift of the transmission, it is necessary that the input clutch assembly 11 be disengaged without regard to engine speed at the beginning of the shift transient. In order to override the self-modulating action described above to force disengagement of the clutch at the beginning of the shift transient without regard to the pressure of fluid 39, an annular piston 44 is slideable within a cavity 46 at the back wall of the housing 47 of the clutch assembly and may be forced forwardly by admission of compressed air into cavity 46 through a conduit 48 communicating with the pneumatic control circuit. Such forward motion of piston 44 is transmitted to pressure plate 36 through a needle bearing 49 disposed between the piston and axially slideable pins 51 transpierced through an annular brake hub 52. Pins 51 in turn bear against an axially slideable annular element 53 which exerts a force against the ends of an additional set of axially slideable pins 56 transpierced through driven hub 33. Springs 54 between element 53 and pins 56 maintain proper race contact of thrust bearings 49 and 57 when piston 44 is not pressurized. The opposite ends of pins 56 bear against the pressure plate 36 through an additional needle bearing 57. Thus forward motion of piston 44 forces disengagement at clutch pack 34 by forcing the pressure plate 36 forwardly. Release of the air pressure signal within chamber 46 at the conclusion of the shift transient enables the self-modulating mechanism described above to reassume control of the pressure on the clutch pack.

As pointed out above, in a transmission of the particular form with which the clutch assembly 11 is employed, release of the clutch pack 34 at the beginning of the shift transient must be accompanied by braking of the shaft 14 in order to stop the change speed gears in the transmission. For this purpose, the brake hub 52 is splined to shaft 14 and alternate ones of a series of brake discs 58 are splined to the rim of the brake hub and situated within a cavity 59 formed by a forwardly extending sleeve 61 secured to the back wall of the housing 47. Sleeve 61 has an annular inwardly extending member 62 against which the brake discs 58 may be compressed by forward movement of a brake piston 63 in cavity 59 in response to the admission of pressurized air into the back portion of the cavity through a conduit 64 connecting with the pneumatic control circuit. At least one of the brake discs 58, situated between discs which are splined to brake hub 52, is splined to the inner wall of sleeve 61. Thus forward movement of brake piston 63 compresses the discs 58 against member 62 thereby stopping rotation of brake hub 52. This stops rotation of the transmission gears by stopping shaft 14.

The structure and operation of clutch assembly 11 as described to this point is basically similar to that described in the above identified co-pending application Ser. No. 30,680. Considering now the novel means of the present invention by which a predetermined slow rotation of shaft 14 is effected, prior to engagement of clutch pack 34 at the conclusion of the shift transient, reference should be made to FIGS. 2 and 3 in conjunction. An annular internally toothed ring gear 66 is formed integrally on the back surface of input member 32 and is coaxial with shaft 14. A first sun gear 67 of substantially less diameter than ring gear 66 is formed integrally on driven hub 33. A second adjacent sun gear 68 is formed on an annular member 69 which is rotatively supported on brake hub 52. The teeth of first and second sun gears 67 and 68 are of substantially less axial length than the teeth of ring gear 66 and the two sets of teeth are adjacent whereby a pair of planetary gears 71, disposed at diametrically opposite positions relative to the sun gears, may be engaged with ring gear 66 and both sun gears simultaneously. Ring bear 66, planetary gear 71 and sun gears 67 and 68 thus constitute an epicyclic gear means which is capable of transmitting torque from input member 32 to shaft 14 independently of clutch pack 34 under certain conditions to be hereinafter described.

Figure 3:
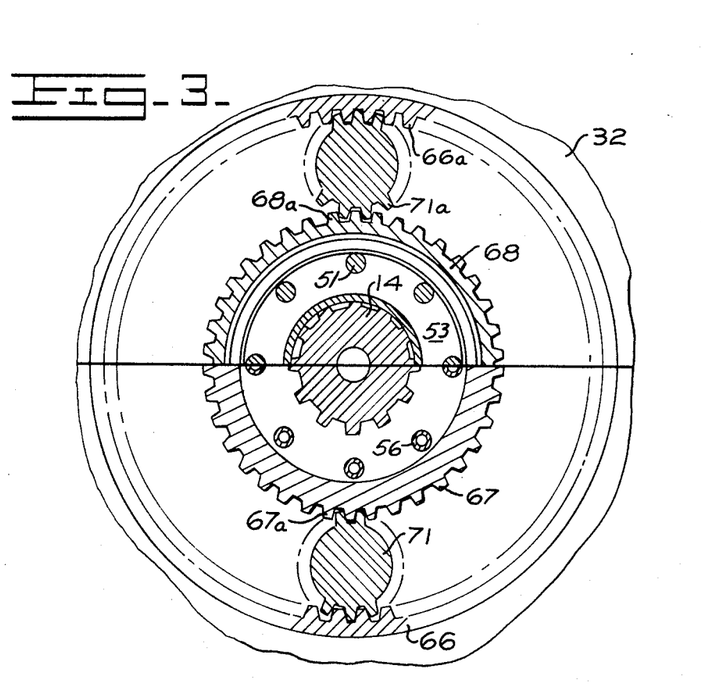
FIG. 3 is a staggered cross-section view taken along line III—III of FIG. 2.

As will be discussed in more detail, control of the action of the epicyclic gear means is effected in part by selective braking of the second sun gear 68. For this purpose an annular brake plate 72 is splined to member 69 and extends radially outward adjacent the forward face of member 62 of sleeve 61. Brake member 72 may be compressed against sleeve member 62, to apply a braking force to the second sun gear 68, by application of a pressurized air signal to still another cavity 74 in housing back wall 47 through a conduit 76 connecting with the pneumatic control circuit. A piston 77 in cavity 74 is thereby forced forward causing a rod 78 which extends forward from the piston to pivot a rocker arm 79 about a bolt 81 which holds the rocker arm against the forward surface of housing element 61. This causes rocker arm 79 to urge a shoe 82 against the forward face of brake member 72 thereby compressing the brake member against sleeve member 61 to exert a light braking force on second sun gear 68 through members 72 and 69.

Referring now to FIG. 3 in particular, which is a staggered cross section view through the clutch assembly and thus shows a portion of the first sun gear 67 in the lower half of the figure and a portion of the second sun gear 68 in the upper half of the figure, an important aspect of the invention is that the two sun gears have slightly differing drive ratios with respect to the planetary gears 71 which engage both sun gears. This is accomplished, in this example of the invention, by providing the second sun gear 68 with fewer teeth than first sun gear 67. In one example of the invention, the ring gear 66 has 90 internal teeth 66a, the two planetary gears 71 each have 15 teeth 71a, while first sun gear 67 has 60 teeth 67a and second sun gear 68 has 58 teeth 68a. Accordingly if one of the sun gears is held stationary while ring gears 66 rotates, the other of the sun gears is forced by planetary gears 71 to undergo a slow rotation wherein the speed reduction ratio relative to flywheel 28 in the particular example described above is approximately 50:1. The necessary modifications of standard gear teeth to enable two gears of substantially the same diameter but having different number of teeth to be jointly engaged and driven by another gear are known to the art and are described in detail, for example, in a paper entitled "Modifying Standard Proportions of Involute Gears" by C. H. Herr published in the SAE Journal, November 1949, pages 19 to 23. Basically, this is accomplished by changing the tooth profile on one of the driven gears to extend the effective pitch diameter of the one gear without necessarily changing the overall diameter.

Considering now the operation of the roll-over mechanism described above, with reference to FIGS. 2 and 4 in conjunction, during the engaged condition of clutch assembly 11 shaft 14 is effectively coupled to flywheel 28 through clutch pack 34. First sun gear 67 is thereby constrained to rotate in synchronism with ring gear 66. Under this condition, the planetary gears 71 are held against rotation about their own axes and are orbited around shaft 14. Since there is no rotation of planetary gears 71 about their own axes, sun gear 68 is locked to sun gear 67, and rotates at the same speed. Inasmuch as brake shoe 82 is released from brake plate 72 at the time, it has no effect on the transmission of torque through the clutch assembly 11.

Figure 4:
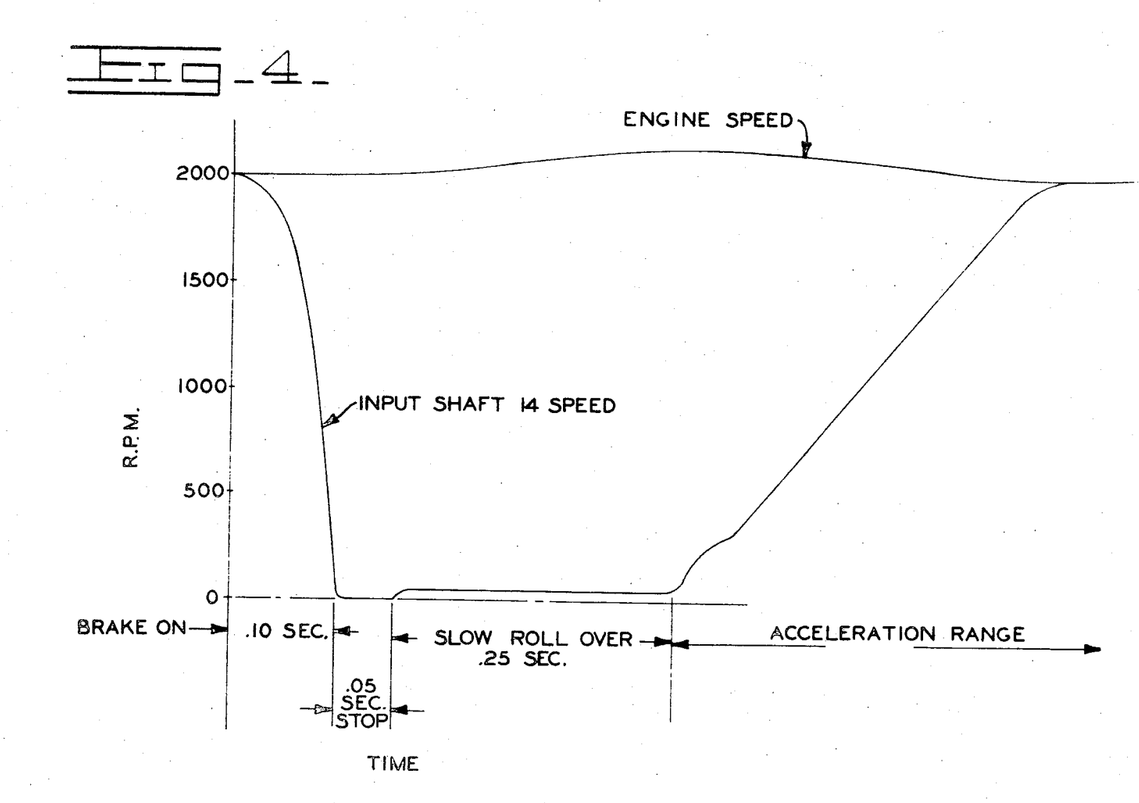
FIG. 4 is a graphical illustration of variations of speed as a function of time of certain elements of the apparatus of FIGS. 1 to 3 during the course of a shift transient.

When a shift transient begins, brake piston 44 is advanced as previously described to disengage the clutch assembly 11 at clutch pack 34. Simultaneously, piston 63 is advanced to brake shaft 14 as previously described, and piston 77 is also advanced at the time to cause shoe 82 to apply braking pressure to brake plate 72 and thus to the second sun gear 68. As shown in FIG. 4, the speed of shaft 14 rapidly decreases to stop the change speed gears in the transmission. At this point in the shift cycle, ring gear 66 continues to turn as it is secured to flywheel 28; however, first sun gear 67 is now stopped as it is coupled to shaft 14. Planetary gears 71 are therefore forced to rotate about their own axes in addition to orbiting about the axis of shaft 14. This in turn forces rotation of second sun gear 68, notwithstanding the light braking pressure applied at shoe 82. With shaft 14 stopped, the previously described pneumatic actuators 23 of the transmission are actuated to attempt the change of gear engagements which are necessary for accomplishing the desired shift of the transmission.

At the next stage in the shift transient, the pneumatic control circuit releases pressurized air from behind brake piston 63, thereby removing the braking force which was applied to shaft 14. Pressure is momentarily maintained in cavity 74 so that the light braking force of shoe 82 against brake plate 72 is temporarily continued after shaft 14 has been released for rotation.

At this point, brake shoe 82 is enabled to stop rotation of the second sun gear 68 inasmuch as the first sun gear 67 is now able to rotate to accommodate to the different drive ratios of the two sun gears relative to the ring gear. Thus, at this point the planetary gears 71 now walk around the stationary second sun gear 68, forcing a small predetermined amount of rotation of first sun gear 67 and shaft 14 as shown in FIG. 4. This is the desired slow rollover rotation of shaft 14 which assures smooth engagement of change speed gears in the transmission.

To conclude the shift transient, the pneumatic control circuit releases pressurized air from behind brake pistons 44 and 77. This initiates the self-modulated reengagement of the clutch assembly 11 at clutch pack 34 as previously described, and releases the pressure of brake shoe 82 against brake plate 72 so that the second sun gear 68 may again rotate synchronously with ring gear 66 and the first sun gear 67.

While the embodiment of the invention described above utilizes a second sun gear 68 having fewer teeth than first sun gear 67 whereby the rollover motion of the shaft 14 is in the same angular direction as the normal rotation of the shaft during the engaged condition of the clutch, it is also possible to provide the first sun gear 67 with fewer but modified teeth relative to standard teeth carried on a second sun gear 68. With such a modification, the rollover motion will then be counter to the normal direction of rotation of shaft 14 but will still provide the desired result of facilitating engagement of change speed gears at the conclusion of the shift transient.

Figure 5:
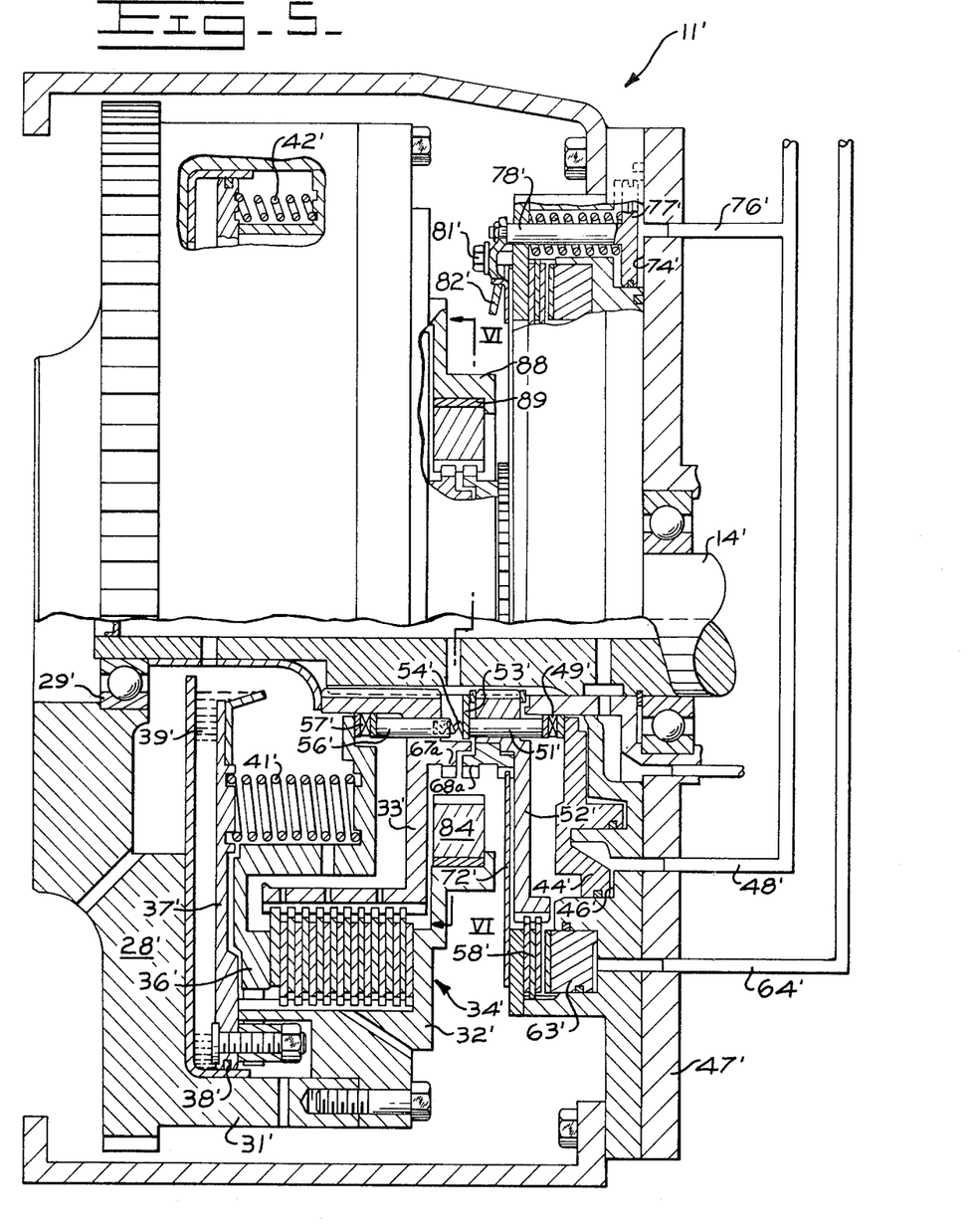
FIG. 5 is a side view, partially broken out and partially in axial section, of a modified form of the input clutch.
Figure 6:
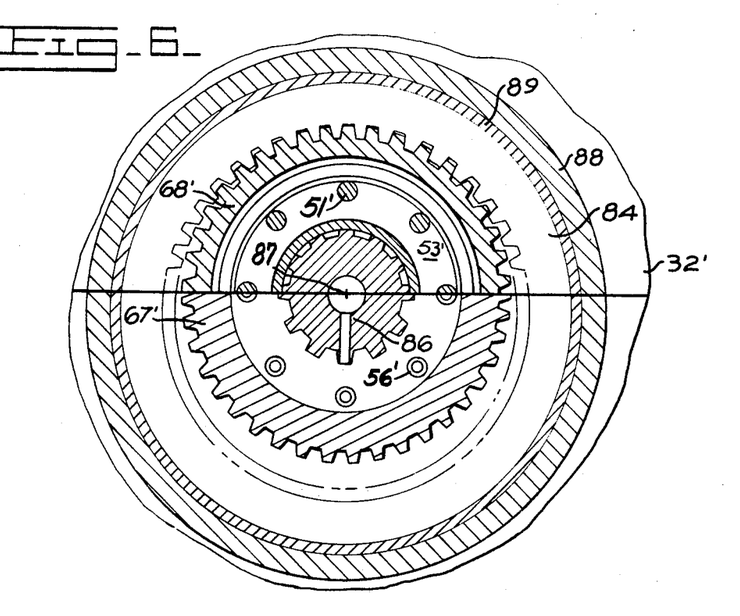
FIG. 6 is a staggered cross-section view taken along line VI—VI of FIG. 5.

Referring now to FIGS. 5 and 6 in conjunction another embodiment of the input clutch assembly 11' is shown wherein a different form of epicyclic gearing is used to provide the desired rollover motion of the main shaft 14' at the conclusion of a shift transient.

Aside from the rollover mechanism, the general construction of clutch assembly is similar to that of the first embodiment and accordingly will not be redescribed, elements of clutch assembly 11' which are similar to those of the first embodiment being designated in FIGS. 5 and 6 by similar reference numerals differentiated by a prime mark.

Considering now the modified rollover mechanism, the first and second sun gears 67' and 68' respectively may be similar to those of the previously described embodiment but are driven by direct engagement with a modified ring gear 84 carried on input member 32' rather than through planetary gears as in the previously described embodiment. As best seen in FIG. 6, this is accomplished by mounting the ring gear 84 eccentrically on input member 34' whereby the geometrical center 86 of the ring gear is displaced from the rotary axis 87 of the input member 32' and sun gears 67' and 68'. Ring gear 84 is supported in this position by disposition within a sleeve 88 formed integrally on the input member 32', an annular bearing 89 being situated between the ring gear and sleeve to provide for relative rotation therebetween. Owing to the eccentric position of ring gear 84 relative to the two sun gears 67' and 68', the ring gear teeth engage the teeth of the two sun gears at a limited circumferential zone thereon which zone orbits around the rotary axis 87 as the input member 32' revolves.

Since as in the previously described embodiment, the two sun gears 67' and 68' have differing number of teeth, but are both engaged with and driven by the same gear means, stopping of one sun gear necessarily forces rotation of the other. Accordingly the eccentrically placed ring gear 84 acts on the two sun gears 67' and 68' in a manner similar to the action of the ring gear and planetary gears of the first described embodiment thereon and the operation of the clutch assembly 11' is otherwise similar to that of the first described clutch assembly 11.

While invention has been described with respect to certain preferred embodiments, it will be apparent that still other modifications are possible and thus it is not intended to limit the invention except as defined in following claims.

What is claimed is:

1. A clutch assembly for transmitting torque from an engine to the change speed gears of a transmission wherein said change speed gears are decoupled from said engine and braked to facilitate shifting, comprising:

a rotary drive input member having means for connection to said engine, a rotary drive output member having means for connection to said change speed gears of said transmission, clutch means having an engaged condition for transmitting drive from said input member to said output member and having a disengaged condition, a first sun gear coupled to said output member for rotation therewith, a second sun gear supported for rotation relative to said output member, epicyclic gear means driven by said input member and engaging each of said sun gears and providing a drive ratio between said input member and said first sun gear which differs from the drive ratio provided between said input member and said second sun gear whereby immobilization of one said sun gears forces rotation of the other thereof, and second sun gear brake means for impeding rotation of said second sun gear while said clutch means is disengaged to cause said first sun gear to rotate said output member.

2. A clutch assembly as defined in claim 1, further comprising output member brake means for braking rotation of said output member while said clutch means is disengaged during an initial portion of the period in which said transmission change speed gears are shifted, and wherein said sun gear brake means applies a lesser braking force to said second sun gear than said output member brake means applies to said output member whereby said sun gear brake means slips to allow rotation of said second sun gear while said output member brake means is applied and subsequently stops said second sun gear when said output member brake means is released.

3. A clutch assembly as defined in claim 1 further comprising a fluid pressure driven piston for actuating said second sun gear brake means.

4. A clutch assembly as defined in claim 1 wherein said first and second sun gears have substantially the same diameter and wherein one sun gear has a different number of gear teeth than the other and a different effective pitch diameter than the other in order to provide said different drive ratios.

5. A clutch assembly as defined in claim 4 wherein said first and second sun gears are disposed in an adjacent coaxial relationship and wherein a single set of teeth carried by said epicyclic gear means engages said teeth of both of said sun gears.

6. A clutch assembly as defined in claim 1 wherein said epicyclic gear means comprises a ring gear supported on said input member in coaxial relation thereon and having internal teeth, and at least one planetary gear disposed between said ring gear and said sun gear, said planetary gear having teeth engaging said teeth of said ring gear and engaging said teeth of both of said sun gears.

7. A clutch assembly as defined in claim 1 wherein said epicyclic gear means comprises an annular ring gear supported on said input member for relative rotation with respect thereto and having gear teeth, said ring gear being positioned eccentrically with respect to said input member whereby said teeth of said ring gear engage teeth of both said sun gears along a limited zone of the circumference of said sun gears which zone orbits around the rotational axis of said sun gears and said input member as said input member rotates.

8. In clutch assembly for disposition between an engine and a transmission gear box of the form wherein change speed gears are disconnected from said engine and braked to facilitate shifting, comprising, in combination:
- a clutch housing,
- an input member rotatable relative to said clutch housing and having means for connection to said engine to be driven thereby,
- a rotatable output shaft extending along the axis of said input member within said housing and journalled for rotation therein,
- an annular driven hub coupled to said output shaft for rotation therewith,
- a plurality of annular coaxial clutch discs, at least one being splined to said input member and at least another one being splined to said driven hub,
- means for applying axial pressure against said plurality of clutch discs for establishing a driving relationship between said input member and said driven hub,
- a first toothed sun gear disposed coaxially with respect to said driven hub for rotation therewith,
- a second toothed sun gear disposed adjacent said first sun gear in coaxial relationship therewith for rotation relative thereto, said second sun gear being of substantially the same diameter as said first sun gear but having a number of teeth which differs from the number of teeth on said first sun gear,
- epicyclic gear means including a ring gear supported on said input member and rotated thereby, said epicyclic gear means having at least one set of teeth which engages the teeth of both of said sun gears transmitting drive from said input member to both of said sun gears, said differing number of teeth on said sun gears establishing a different drive ratio between said first sun gear and said input member and said second sun gear and said input member whereby stopping of one of said sun gears necessitates rotation of the other thereof,
- at least one brake member coupled to said second sun gear for rotation therewith,
- first brake means for stopping rotation of said output shaft when said pressure on said plurality of clutch discs is released to disengage said clutch assembly, and
- second brake means for applying pressure to said brake member to stop rotation of said second sun gear when said first brake means is released.

9. The combination defined in claim 8 wherein said ring gear is secured to said input member in coaxial relationship thereon, and wherein said epicyclic gear means further comprises at least one planetary gear engaging said ring gear and both of said sun gears.

10. The combination defined in claim 8 wherein said ring gear is eccentrically positioned relative to said input member and is supported thereon for rotation relative thereto, and wherein said ring gear is engaged with both of said sun gears at a limited zone of the circumference thereof.

* * * * *